(12) United States Patent
Naitoh

(10) Patent No.: US 10,491,763 B2
(45) Date of Patent: Nov. 26, 2019

(54) IMAGE FORMING APPARATUS CONFIGURED TO PARTITION MENU INFORMATION TRANSMITTED FROM A MAIN DEVICE TO A CONTROL DEVICE, CONTROL DEVICE, AND SCREEN DISPLAY METHOD OF PERFORMING SAME

(71) Applicant: Hisashi Naitoh, Tokyo (JP)

(72) Inventor: Hisashi Naitoh, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/691,962

(22) Filed: Aug. 31, 2017

(65) Prior Publication Data

US 2018/0084123 A1  Mar. 22, 2018

(30) Foreign Application Priority Data

Sep. 16, 2016 (JP) .................................. 2016-182382

(51) Int. Cl.
*G06F 3/12* (2006.01)
*H04N 1/00* (2006.01)

(52) U.S. Cl.
CPC ....... *H04N 1/00408* (2013.01); *G06F 3/1208* (2013.01); *G06F 3/1237* (2013.01); *H04N 1/00949* (2013.01)

(58) Field of Classification Search
CPC combination set(s) only.
See application file for complete search history.

(56) References Cited

U.S. PATENT DOCUMENTS

| 9,001,048 B2* | 4/2015 | Morita | G06F 3/0488 345/156 |
| 2006/0227343 A1* | 10/2006 | Yamaguchi | H04N 1/00244 358/1.1 |
| 2009/0067083 A1* | 3/2009 | Ikenoue | G06F 1/3221 360/75 |
| 2010/0141552 A1* | 6/2010 | Ferlitsch | G06F 3/1446 345/1.3 |

(Continued)

FOREIGN PATENT DOCUMENTS

JP  2016-001779  1/2016

*Primary Examiner* — Benjamin O Dulaney
(74) *Attorney, Agent, or Firm* — Harness, Dickey & Pierce, P.L.C.

(57) ABSTRACT

An image forming apparatus includes a first device and a second device communicably connected to the first device. The first device includes a first memory to store, for each one of a plurality of workflows executable by the image forming apparatus, target information to be used for displaying a setting screen and first circuitry. The second device includes a second memory to store, before a user instruction to display a menu is input, target information to be used to display the menu for selecting one of the plurality of workflows to be performed by the image forming apparatus, a display, and second circuitry. The second circuitry displays, on the display, the menu based on the target information stored in the second memory, obtains, from the first memory, target information corresponding to the workflow selected via the menu, and displays, on the display, a setting screen corresponding to the workflow selected, based on the target information obtained from the first memory.

14 Claims, 9 Drawing Sheets

(56) References Cited

U.S. PATENT DOCUMENTS

| | | | |
|---|---|---|---|
| 2015/0070726 A1* | 3/2015 | Umezawa | H04N 1/00416 |
| | | | 358/1.15 |
| 2015/0201091 A1* | 7/2015 | Yokoyama | H04N 1/00106 |
| | | | 358/1.15 |
| 2015/0365481 A1 | 12/2015 | Nakamura | |
| 2016/0239565 A1* | 8/2016 | Falkner | G06F 16/345 |
| 2017/0263217 A1* | 9/2017 | Tomono | G09G 5/391 |
| 2017/0277370 A1* | 9/2017 | Fujii | G06F 3/0482 |
| 2017/0310829 A1* | 10/2017 | Kimura | G06F 3/1204 |
| 2018/0007229 A1* | 1/2018 | Adachi | H04N 1/32662 |
| 2018/0068345 A1* | 3/2018 | Hirokawa | G06Q 30/0251 |

\* cited by examiner

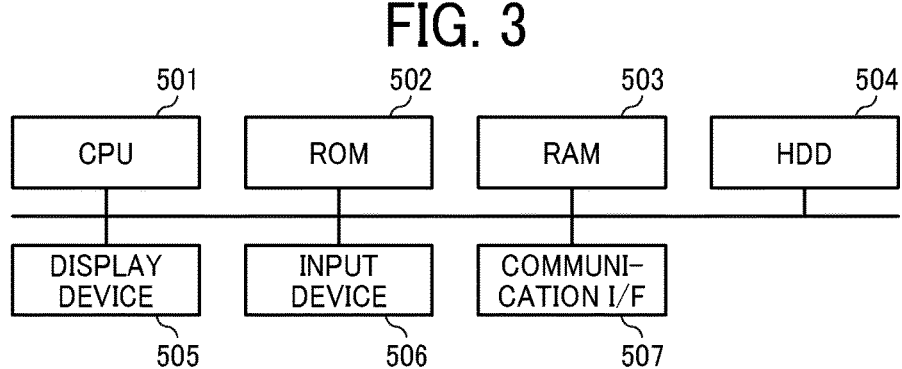
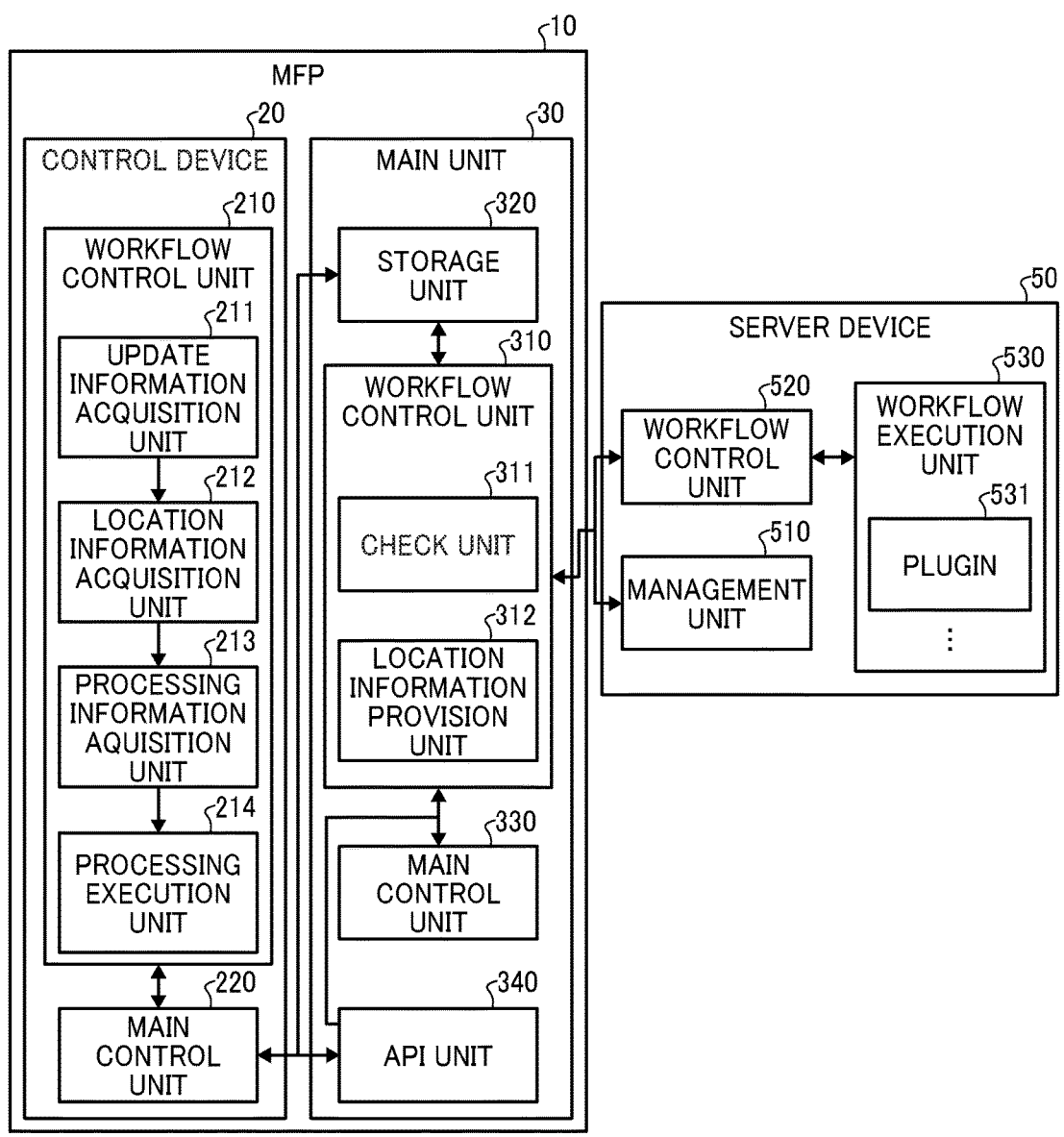

| Profile | Group | | Project | | | |
|---|---|---|---|---|---|---|
| | Label | Screen layout | Label | Reading Conditions | Process | Storage Cooperation |
| A4pf | Sales | Assignment Button Arrangement Information | Daily Report | Duplex, 300dpi,jpeg | OCR | Quanp,／Daily Report |
| | | | Expense Sheet | Single-Side, 600dpi,pdf | - | Quanp,／Expense Sheet |
| | | | Client Information | | | |
| | Development | | | | | |

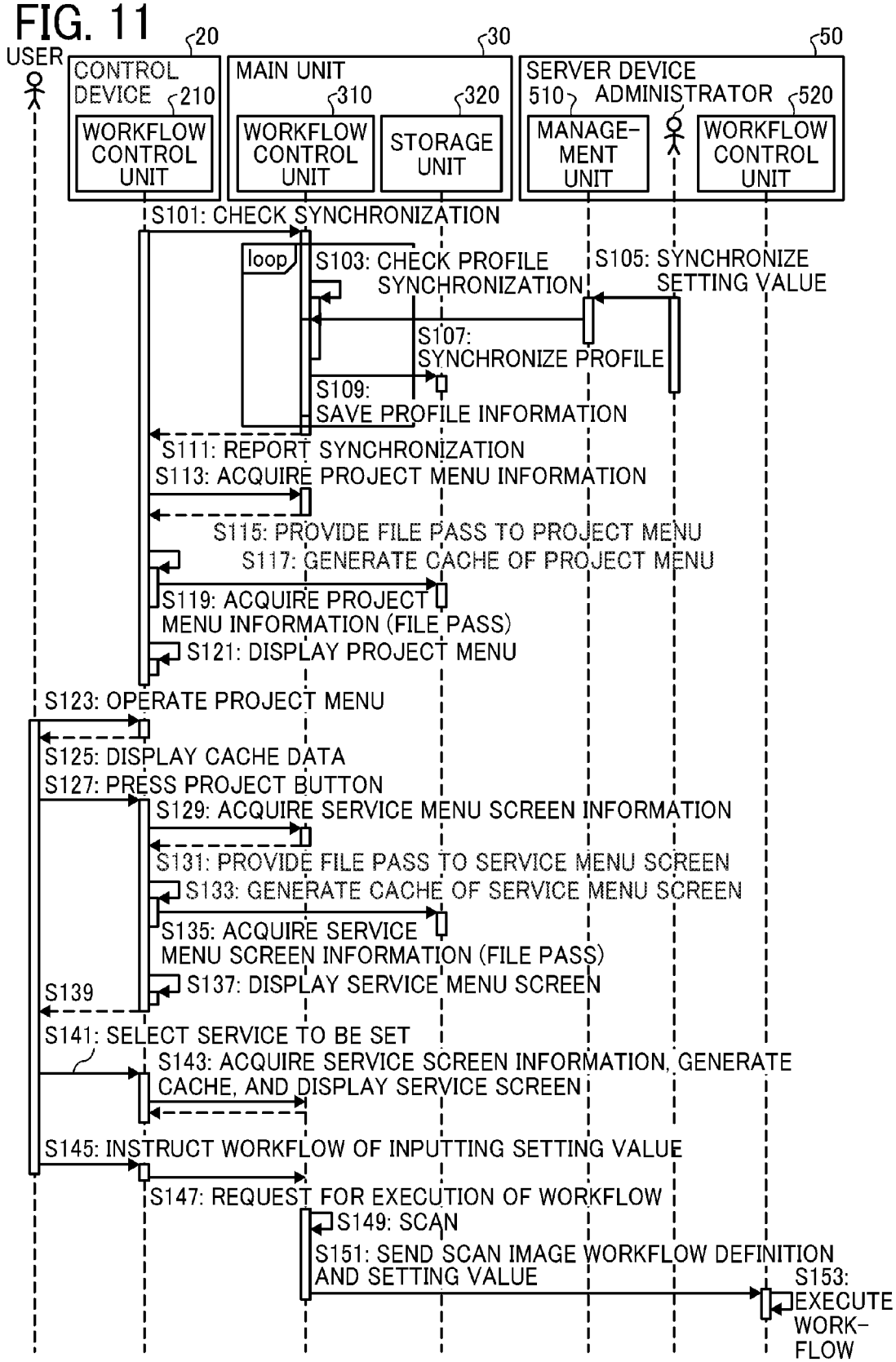

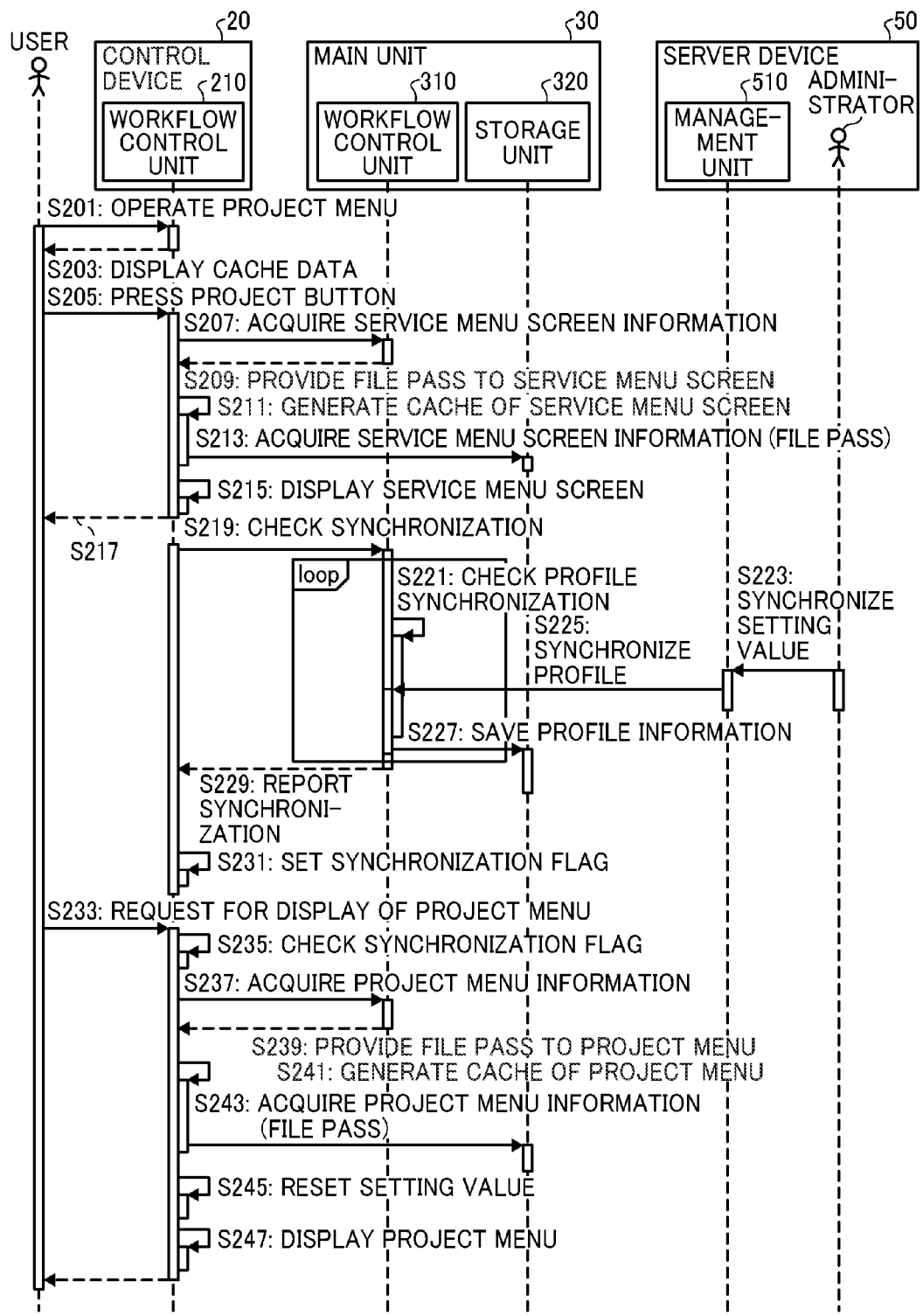

IMAGE FORMING APPARATUS CONFIGURED TO PARTITION MENU INFORMATION TRANSMITTED FROM A MAIN DEVICE TO A CONTROL DEVICE, CONTROL DEVICE, AND SCREEN DISPLAY METHOD OF PERFORMING SAME

CROSS-REFERENCE TO RELATED APPLICATION

This patent application is based on and claims priority pursuant to 35 U.S.C. § 119(a) to Japanese Patent Application No. 2016-182382, filed on Sep. 16, 2016, in the Japan Patent Office, the entire disclosure of which is hereby incorporated by reference herein.

BACKGROUND

Technical Field

Embodiments of the present disclosure relate to an image forming apparatus, a control device, and a screen display method.

Related Art

An image forming apparatus that executes processing, for example, scan distribution, according to a workflow in which a plurality of types, or steps, of processing are defined by an administrator is known.

In recent years, a configuration in which an image forming apparatus including a main apparatus and a control device separated from the main apparatus has evolved to the point where the main apparatus performs functions related to image forming, such as copying, scanning, faxing, and printing, and the control device performs the types of information processing that hitherto has generally been performed by the main apparatus. With such a configuration, a user sets a function to be performed using one of the main apparatus and the control device via an operating screen displayed on the control device.

The image forming apparatus may store information to be used in the control device in a nonvolatile memory (e.g., hard disc drive (HDD)) of the main apparatus because of limitations of the nonvolatile memory (e.g., NAND) of the control device. In this case, the control device obtains the information from the nonvolatile memory of the main apparatus, stores the information in a volatile memory (e.g., random access memory (RAM)) of the control device, and processes the information.

However, generally, the capacity of the volatile memory of the control device is smaller than that of the nonvolatile memory. The volatile memory of the control device also needs to maintain an area to perform the information processing. It is, accordingly, difficult to store a large amount of information obtained from the nonvolatile memory of the main apparatus in the volatile memory of the control device.

When, for example, a user sets a desired operation to be performed, it can be supposed that the control device obtains screen information required to display an operating screen corresponding to the function from the nonvolatile memory of the main apparatus and stores the screen information in the volatile memory of the control device to perform display processing for the operating screen. The larger the number of operating screens corresponding to the function instructed by the user is, the larger the data size of the screen may become, which results in slower processing and display delays.

SUMMARY

According to one embodiment, an image forming apparatus includes a first device and a second device communicably connected to the first device. The first device includes a first memory, which is a nonvolatile memory, to store, for each one of a plurality of jobs executable by the image forming apparatus, target information to be used for displaying a setting screen for the workflow and first circuitry to control operation of the image forming apparatus. The second device includes a second memory, which is a volatile memory, to store target information to be used to display a menu for selecting, from the plurality of jobs, a workflow to be performed by the image forming apparatus, a display, and second circuitry. The second circuitry displays, on the display, the menu based on the target information stored in the second memory in response to a user instruction for displaying the menu, obtains, from the first memory, target information that corresponds to the workflow selected via the menu in response to selection of the workflow by a user via the menu, and displays, on the display, a setting screen corresponding to the workflow selected by the user via the menu, based on the target information that is obtained from the first memory. The first circuitry controls the image forming apparatus to perform the workflow selected via the menu based on a setting value set via the setting screen.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 3 is a schematic diagram illustrating a hardware configuration of a server device according to an embodiment of the present disclosure;

FIG. 4 is a block diagram illustrating a functional configuration of the information processing system according to an embodiment of the present disclosure;

FIG. 11 is a sequence diagram illustrating an example of processing executed by an information processing system according to an embodiment of the present disclosure; and FIG. 12 is a sequence diagram illustrating another example of processing of the information processing system according to an embodiment of the present disclosure.

DETAILED DESCRIPTION

Figure 1:
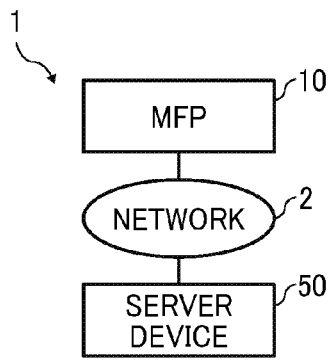
FIG. 1 is a block diagram illustrating a configuration of an information processing system according to an embodiment of the present disclosure.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof. In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operation in a similar manner, and achieve a similar result.

An image forming apparatus, a control device, a screen display method, and a non-transitory recording medium storing a plurality of instructions according to embodiments of the disclosure are described below. In the following description, a multifunction peripheral (MFP) is used as one example to describe the image forming apparatus, however, the embodiment is not limited to this. The MFP is an apparatus that has at least two functions of a print function, a copy function, a scanner function, and a facsimile communication function. Besides the MFP, another example of the image forming apparatus may be a printer, a copier, a scanner, a facsimile or the like.

FIG. 1 is a block diagram illustrating an information processing system 1 according to an example embodiment of the present disclosure. As illustrated in FIG. 1, the information processing system 1 includes a MFP 10 and a server device 50, connected to each other via a network 2. The network 2 is, for example, a local area network (LAN) or the Internet; however, the network 2 is not limited to these, and alternatively may be any suitable type of network.

Figure 2:
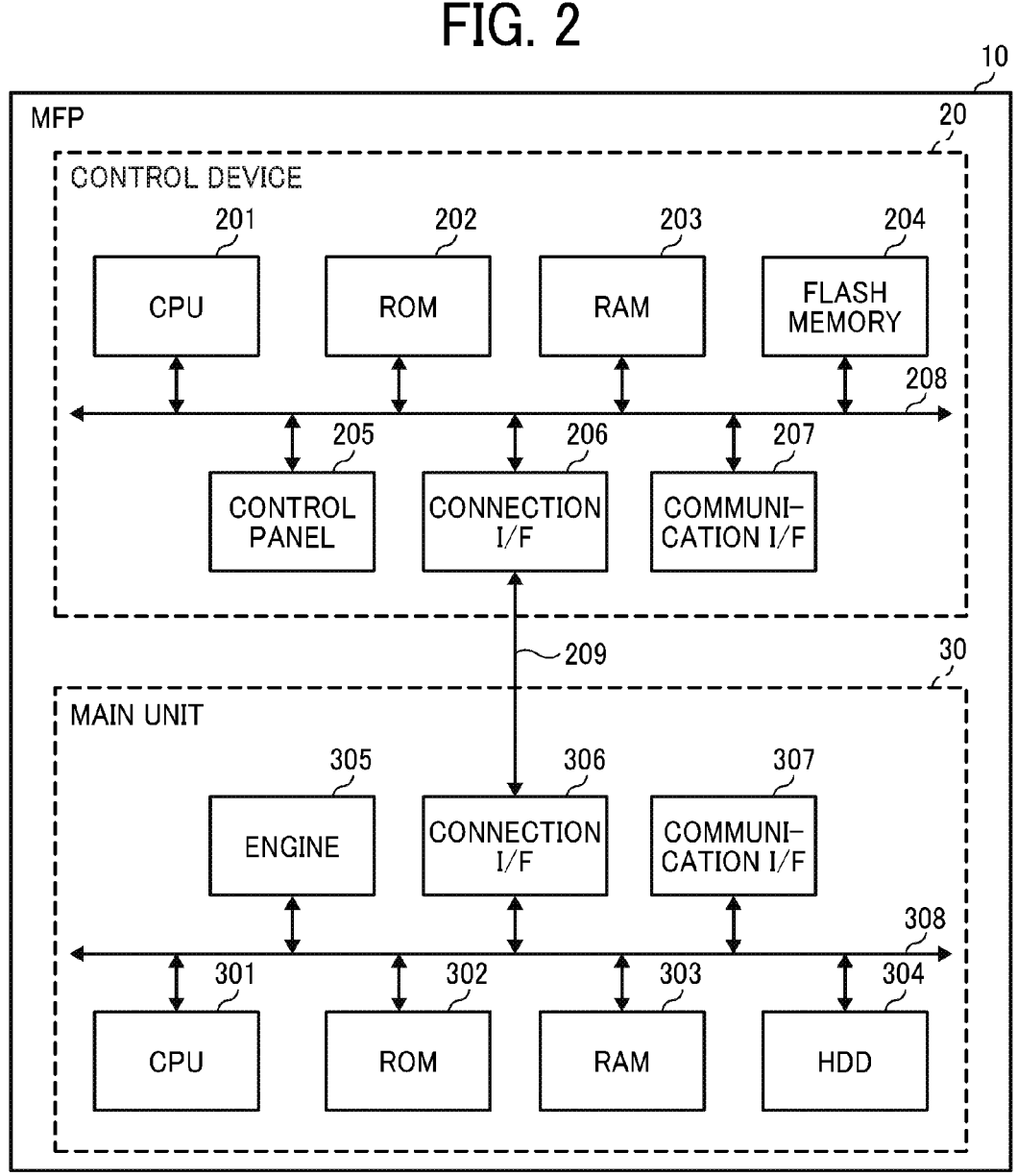
FIG. 2 is a block diagram illustrating a hardware configuration of a multifunction peripheral (MFP) according to an embodiment of the present disclosure.

FIG. 2 is a block diagram illustrating a hardware configuration of the MFP 10 according to the present embodiment. As illustrated in FIG. 2, the MFP 10 includes a control device 20 (one example of the information processing device), and a main unit 30 (one example of an external apparatus).

The main unit 30 and the control device 20 are communicably connected to each other via a dedicated communication path 209. As the communication path 209, for example, a universal serial bus (USB) may be used.

In the present embodiment, the number of control devices connected to the main unit 30 in FIG. 2 is one, the control device 20. However, the present embodiment is not limited to such a configuration, and thus any number of control devices may be connected to the main unit 30 as long as the main unit 30 can support these devices. Conversely, one or more main bodies 30, may be connected to the control device 20.

The main unit 30 includes a central processing unit (CPU) 301, a read only memory (ROM) 302, a random access memory (RAM) 303, a hard disc drive (HDD) 304, an engine 305, a connection interface (I/F) 306, and a communication I/F 307. The CPU 301, the ROM 302, the RAM 303, the HDD 304, the engine 305, the connection I/F 306, and the communication I/F 307 are connected to each other through a system bus 308.

The engine 305 is hardware that performs general-purpose processing for copying, scanning, faxing, and printing, except for information processing and communication processing. The engine 305 includes, for example, a scanner (image reading device) that scans and reads an image of a document, a plotter (image forming device) that prints the image on a sheet member such as a sheet of paper, and a facsimile communication device that carries out facsimile communication. The engine 305 may also include other, optional devices, such as a finisher that sorts printed sheets and an automatic document feeder (ADF) that automatically feeds the document.

The CPU 301 controls overall operation of the main unit 30. The CPU 301 executes a program stored in the ROM 302 or the HDD 304 using the RAM 303 as a work area. With this, the CPU 301 controls overall operation of the main unit 30, namely, the CPU 301 causes the engine 305 to implement the above-mentioned operations, such as copying, scanning, faxing, and printing.

The connection I/F 306 is an interface to communicate with the control device 20 through the communication path 209. The communication I/F 307 is an interface to communicate with the control device 20 and the server device 50 via the network 2.

The control device 20 receives a user input. The control device 20 displays various types of images (screens). The control device 20 is installed with a specific operating system (OS). According to the input received with the control device 20, the main unit 30 performs operation. That is, the control device 20 controls the main unit 30. The control device 20 processes information by itself or in cooperation with the main unit 30 according to the user input.

The control device 20 includes a CPU 201, a ROM 202, a RAM 203, a flash memory 204, a control panel 205, a connection I/F 206, and a communication I/F 207. The CPU 201, the ROM 202, the RAM 203, the flash memory 204, the control panel 205, the connection I/F 206, and the communication I/F 207 are connected to each other through a system bus 208.

The CPU 201 controls overall operation of the control device 20. The CPU 201 executes a program stored in the ROM 202 or the flash memory 204 using the RAM 203 as a work area to control overall operation of the control device 20. By executing the program, the CPU 201 implements various types of functions described later.

The connection I/F 206 is an interface to communicate with the main unit 30 through the communication path 209. The communication I/F 207 is an interface to communicate with the main unit 30 and the server device 50 via the network 2.

The control panel 205 receives various types of inputs according to an operation of a user and displays the various types of images (screens). In the embodiment, the control panel 205 is a touch panel that can both receive the various types of inputs and display the various types of images (screens), however, it is not limited to this. For example, the control panel 205 may include an input device to receive the various types of inputs and a display device to display various types of information.

FIG. 3 is a schematic diagram illustrating an example of a hardware configuration of the server device 50 according to the embodiment. As illustrated in FIG. 3, the server device 50 includes a CPU 501, a ROM 502, a RAM 503, a HDD 504, a display device 505, an input device 506, and a communication I/F 507.

The CPU 501 controls overall operation of the server device 50. The CPU 501 executes a program stored in the ROM 502 or the HDD 504 using the RAM 503 as a work area to control overall operation of the server device 50. By executing the program, the CPU 501 implements various types of functions described later.

The communication I/F 507 is an interface to communicate with the control device 20 and the main unit 30 of the MFP 10 via the network 2. The display device 505 displays various types of images (screens). The input device 506 receives a user input. In the embodiment, the display device 505 and the input device 506 are separated from each other, however, the embodiment is not limited to this configuration and alternatively, the display device 505 and the input device 506 may be integrally configured as a touch panel.

FIG. 4 is a block diagram illustrating a functional configuration of the information processing system 1 according to an example embodiment of the present disclosure. As illustrated in FIG. 4, the control device 20 includes a workflow control unit 210 and a main control unit 220. The workflow control unit 210 and the main control unit 220 can be implemented with the CPU 201, the RAM 203, the connection I/F 206, and the communication I/F 207, for example.

The workflow control unit 210 is an application (workflow application) to provide a workflow function that operates on the main control unit 220 that is an OS. Such an OS that implements the main control unit 220 is, for example, Android OS, but not limited to this. The workflow control unit 210 implements the workflow function by operating in cooperation with a workflow control unit 310 of the main unit 30 and a workflow control unit 520 of the server device 50 via the main control unit 220 and an application programming interface (API) unit 340 of the main unit 30. The workflow control unit 210 also implements a user interface (UI) in association with the workflow function by acquiring screen information of a setting screen for setting for the workflow function from a storage unit 320 of the main unit 30 via the main control unit 220.

As illustrated in FIG. 4, the main unit 30 includes the workflow control unit 310 (one example of a processor), the storage unit 320, the main control unit 330, and the API unit 340. The workflow control unit 310 and the main control unit 330 can be implemented with, for example, the CPU 301, the RAM 303, the connection I/F 306, and the communication I/F 307. The storage unit 320 may be implemented with the HDD 304.

The workflow control unit 310 is an application (workflow application) that provides a workflow function that operates on the main control unit 330. The main control unit 330 may be implemented with Java (registered trademark) virtual machine (VM). The main control unit 330 serves as a group of modules to provide a module for the workflow control unit 310 to use the various functions of the MFP 10, such as the scanner. The API unit 340 is an interface for utilizing the various functions of the main unit 30 from the external including the control device 20. The control device 20 calls an interface remotely provided by the API unit 340 using, for example, hypertext transfer protocol (HTTP) communication to implement the functions of the main unit 30. The workflow control unit 310 cooperating with the workflow control unit 210 of the control device 20 and the workflow control unit 520 of the server device 50 manages setting data of a workflow and UI information received from a management unit 510 of the server device 50. In addition, the workflow control unit 310 requests to the main control unit 330 for execution of scan processing of reading a document and sending a scan image to the workflow control unit 520 to request for execution of the workflow, according to a user operation via the workflow control unit 210.

The storage unit 320 is a nonvolatile memory used by the workflow control unit 210 and the workflow control unit 310. In FIG. 4, the storage unit 320 is mounted with a network file system (NFS), to enable the workflow control unit 210 to operate the NFS via the network 2.

As illustrated in FIG. 4, the server device 50 includes the management unit 510 and the workflow control unit 520. The management unit 510 and the workflow control unit 520 are implemented with, for example, the CPU 501, the RAM 503, and the communication I/F 507.

The workflow control unit 520 cooperates with the workflow control unit 310 of the main unit 30 to execute a workflow job. More specifically, the workflow control unit 520, which cooperates with the workflow control unit 310 of the main unit 30, requests a workflow execution unit 530 to execute processing, in relation to the scan image, according to a workflow in which various types, or steps, of processing such as image conversion, distribution, and the like are defined, and controls execution of the workflow job. The workflow execution unit 530 calls a plugin 531 corresponding to each of the types of processing requested in response to an execution request from the workflow control unit 520 and executes the requested processing. The plugin 531 is a program (service) that executes each type of processing defined in the workflow (job). The plugin 531 includes, for example, an intermediate plugin that executes intermediate processing, such as an image conversion, image correction, and Optical Character and Recognition (OCR), and a distribution plugin that executes distribution of data to a folder address or a mail address. For example, when a workflow job corresponding to a workflow that s defined with the image correction, the Portable Document Format (PDF) conversion, the OCR, and a folder distribution in this order, is performed, according to a request from the workflow control unit 520, an image correction plugin corrects image data in the image correction, a PDF conversion plugin converts the image data into a PDF format to generate PDF data in the PDF conversion after the image correction, an OCR plugin performs the OCR processing on the PDF data to generate the PDF data having texts in the OCR, and a folder distribution plugin sends the PDF data having the texts to a folder designated in the folder distribution. The management unit 510 provides a user interface module that defines the workflow, sets the workflow, and sets a system profile. The management unit 510 also stores a setting value set by an administrator via the user interface, and distributes the setting value to the workflow control unit 310 via the user interface. The setting value is used to display a screen on the workflow control unit 310 via the user interface. The setting value is used to display a screen on the control device 20.

The workflow control unit 210 of the control device 20 includes an update information acquisition unit 211, a location information acquisition unit 212, a processing information acquisition unit 213 (one example of a control unit), and a processing execution unit 214 (one example of a display unit).

The update information acquisition unit 211 requests the main unit 30 (workflow control unit 310) to check whether there is an update on a workflow definition, workflow settings or system settings, and if so, acquires update information.

The location information acquisition unit 212 requests the main unit 30 (workflow control unit 310) for location information that indicates a location, where screen information required to display the setting screen on the control device 20 is in the storage unit 320, via the network 2 (one example of a first communication path), and acquires the location information. More specifically, the location information acquisition unit 212 acquires the location information from the main unit 30 (workflow control unit 310) when the update information acquisition unit 211 acquires the update information.

The processing information acquisition unit 213 acquires the screen information from the storage unit 320 via the communication path 209 (one example of second communication path) based on the location information acquired from the location information acquisition unit 212.

The processing execution unit 214 executes a screen display based on the screen information acquired by the processing information acquisition unit 213.

According to the embodiment, the workflow control unit 210 of the control device 20 requests the workflow control unit 310 of the main unit 30 for various types of information through a Hypertext Transfer Protocol (HTTP) communication. However, the communication protocol is not limited to the HTTP.

The workflow control unit 210 of the control device 20 can access the storage unit 320 of the main unit 30 with the NFS, and the workflow control unit 310 of the main unit 30 replies with a path to the location of data in the storage unit 320, as described above, instead of sending the data through the HTTP (HTTP response). The workflow control unit 210 performs mounting operation based on the path replied and accesses the storage unit 320.

The workflow control unit 210 of the control device 20 actually accesses the data in the storage unit 320 by referring to the path replied as described above. The workflow control unit 210 does not save the obtained data in the flash memory 204, but holds as cache data in the RAM 203 and performs the processing according to the user operation. This is because the flash memory 204 uses a NOT AND (NAND) that has a limitation to the number of writes. To prolong the life of the flash memory 204, it is preferable not to use the flash memory 204 as much as possible. To prevent reduction of the life of the flash memory 204, the storage unit 320 according to the embodiment stores data used by the workflow control unit 210.

The workflow control unit 310 of the main unit 30 includes a check unit 311 and a location information provision unit 312.

The check unit 311 checks, in response to a request for checking from the control device 20 (workflow control unit 210), whether processing information used in at least any one of the plurality of types of processing is updated, and if so, provides updated information.

The location information provision unit 312 provides the location information according to the request for the location information from the control device 20 (workflow control unit 210).

In the embodiment, the workflow control unit 310 of the main unit 30 serves as a server, and executes processing in response to the above-mentioned request from the workflow control unit 210 (HTTP request) and another HTTP request from the management unit 510 of the server device 50. The workflow control unit 310 of the main unit 30 manages profile information in synchronized with that in the management unit 510, and sends a path to the data to the workflow control unit 210, if necessary. The workflow control unit 310 of the main unit 30 sends workflow data (scan image) and setting information required for executing the workflow to the server device 50 to request for the execution of the workflow to the workflow control unit 520 according to operation to the UI from the workflow control unit 210.

In this embodiment, HTTP communication from the workflow control unit 210 to the workflow control unit 310 is possible, however HTTP communication in the opposite direction is not possible. With this system, connection from the workflow control unit 210 to the workflow control unit 310 is generally applied all the time, and the workflow control unit 310 transmits an HTTP response to the workflow control unit 210 to report data update when data used for the workflow is updated, for example, when the setting value is in synchronized with that in the management unit 510.

As described above, in the MFP 10 according to the embodiment, the various types of data used by the workflow control unit 210 and the workflow control unit 310 is saved and managed in the storage unit 320 of the main unit 30. The workflow control unit 310 provides an I/F with which the data is synchronized with that in the management unit 510 and an I/F with which the workflow control unit 210 acquires the path to the data in the storage unit 320. The workflow control unit 210 also manages the data obtained using the path to the storage unit 320 as a cache data in the main storage memory, and executes processing in relation to user accesses at high speed.

In the description of the embodiment above, the processing executed based on the data acquired by the workflow control unit 210 is UI display processing, however, the embodiment is not limited to this.

Figure 5:
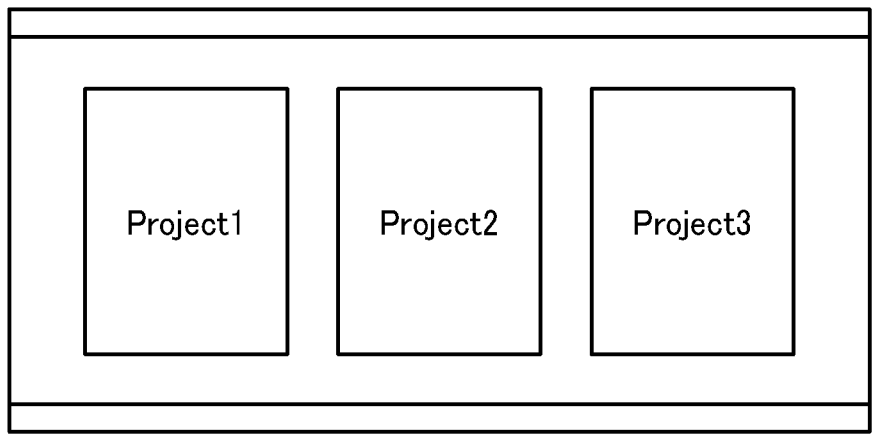
FIG. 5 is an illustration of an example of a project menu according to an embodiment of the present disclosure.
Figure 6:
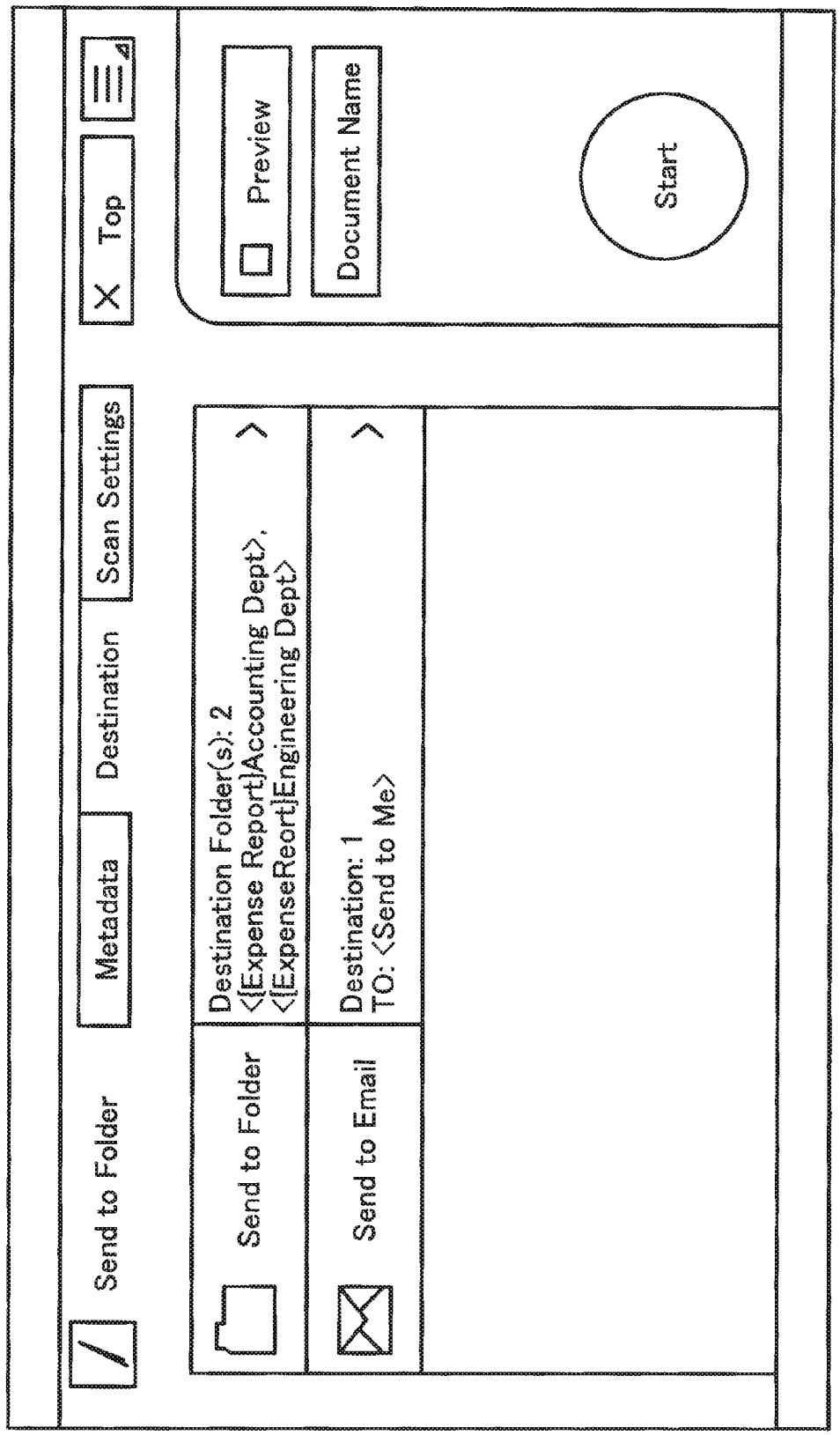
FIG. 6 is an illustration of an example of a service menu screen according to an embodiment of the present disclosure.
Figure 7:
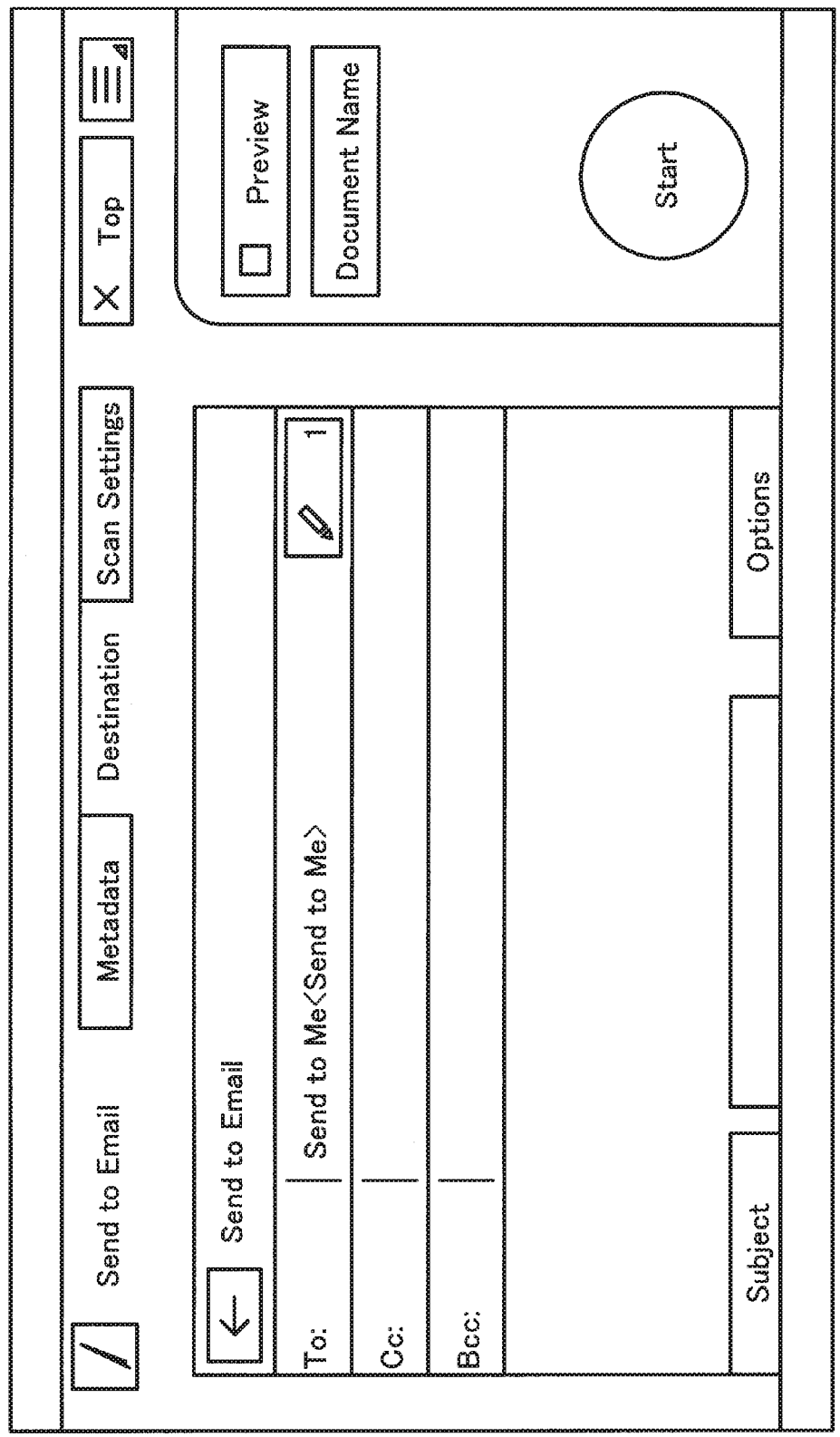
FIG. 7 is an illustration of another example of a service menu screen according to an embodiment of the present disclosure.

The workflow control unit 210 according to the embodiment is assumed as a workflow application, and examples of a UI display screen includes a (workflow) project menu, a service menu screen, and a service screen illustrated respectively in FIG. 5, FIG. 6, and FIG. 7. In the screens illustrated in FIGS. 5 to 7, the project menu illustrated in FIG. 5 is a first layer screen, the service menu screen illustrated in FIG. 6 is a second layer screen, and the service screen illustrated in FIG. 7 is a third layer screen.

That is, when a user selects the workflow application from an application list displayed on the control device 20, which includes a copy application, a print application, a scan application, a facsimile communication application, and workflow application, the project menu illustrated in FIG. 5 is displayed. When the user selects one of the projects (workflow) on the project menu as illustrated in FIG. 5, the service menu screen as illustrated in FIG. 6 is displayed as a service menu screen to set for the selected project. For example, when a workflow defined with folder distribution and mail distribution is selected, a setting screen to select destination of the mail distribution or the folder distribution is displayed. When a service to be set and used on the service menu screen as illustrated in FIG. 6 is selected, the service screen as illustrated in FIG. 7 is displayed as a service screen of the service.

For example, when the user selects "Send to Email" to set the destination of the mail distribution via the setting screen illustrated in FIG. 6, a setting screen to set a destination of the mail distribution is displayed. The user sets the destination of an email and the like with this screen and press a "Start" button to instruct to execute the project (workflow) selected with the project menu illustrated in FIG. 5 based on the information set with the screens as illustrated in FIG. 6 and FIG. 7. In addition, when a button for returning in the service screen illustrated in FIG. 7 is pressed, the service menu screen, as illustrated in FIG. 6, can be displayed again. As described above, the user can instruct to execute the workflow after setting all of the services. With the setting screens as illustrated in FIG. 6 and FIG. 7, in addition to the destination of the folder distribution and the mail distribution, for example, a type of image correction (e.g., top/bottom determination, inclination correction) and a version of portable document format (PDF) conversion may be set. That is, each setting screen transitions in a predetermined order according to a user instruction. Additionally, the setting value set by the user is stored to correspond to the setting screen, and when the setting screen is displayed again according to the user instruction, the setting screen is displayed with the setting value stored.

The workflow control unit 210 and the workflow control unit 310 according to the embodiment uses a logic as described above to display the UI screens at high speed.

Figure 8:
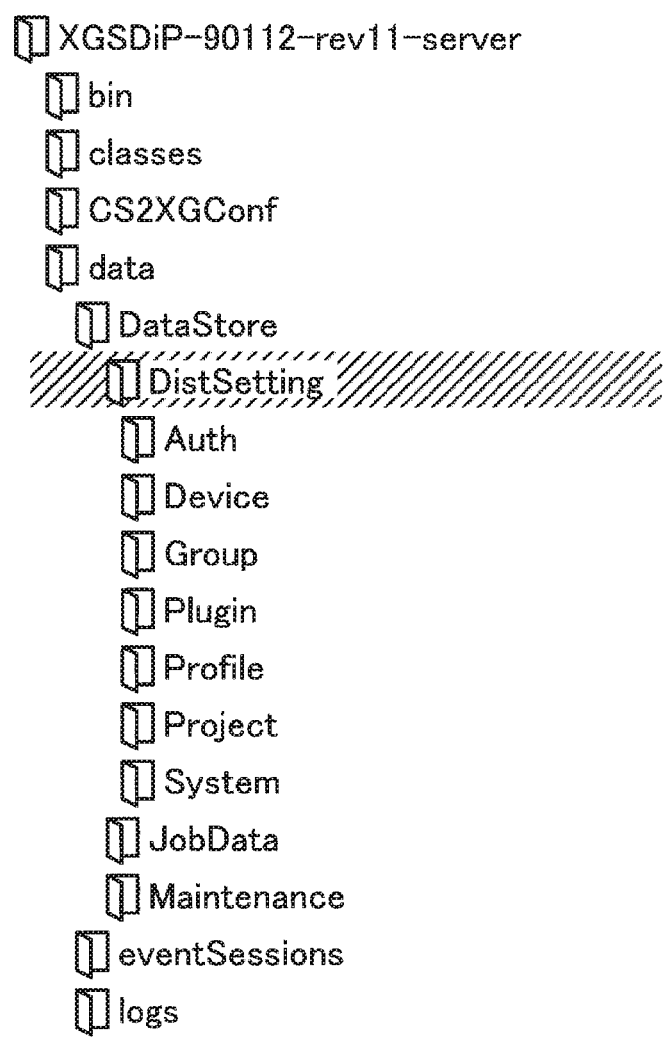
FIG. 8 is an illustration of an example of data used to control a user interface (UI) according to an embodiment of the present disclosure.

Additionally, data used to control the UI is managed in the storage unit 320 with folders as illustrated in FIG. 8. In FIG. 8, the folder "Auth" stores information for providing an authentication screen and function when a project authentication is set, the folder "Group" stores information concerning a group, to which a user belongs, of the project menus, Plugin stores information concerning the service (plugin), Profile stores information concerning the project menu, and Project stores information concerning each project screen.

The concept of Profile is now briefly described. "Profile" is setting information concerning an overall workflow system, including definition information on project (workflow) defined by the administrator, and an initial settings for each service belonging to the workflow and setting items that can be set with control device 20 by the user. Additionally, Profile includes information required to display the project setting screen, and the service menu screen and the service screen according to each project. Profile is associated with the workflow application of the MFP 10, and stores all of the information on read setting conditions, processing on a read image, and a destination of distribution, which are assigned to an assignment button from an assignment button layout of the control panel 205. Additionally, three pieces of information including the Profile information illustrated in FIG. 9, and Profile and a control panel illustrated in FIG. 10, are associated with each other.

Figures 9, 10:
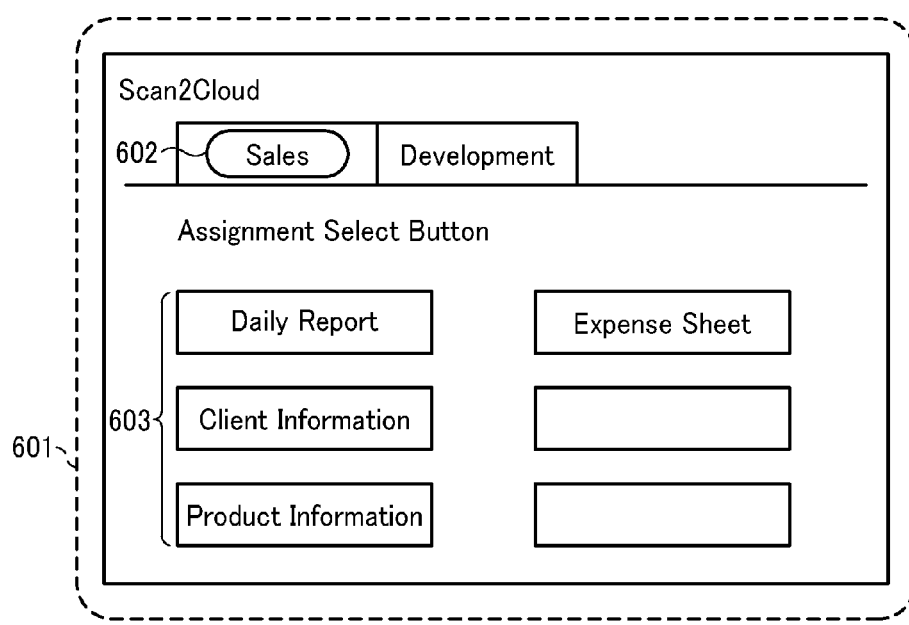
FIG. 9 is an illustration of an example of Profile information.
FIG. 10 is an illustration of association between Profile and a control panel.

In the Profile information illustrated in FIG. 9, three projects, "Daily Report", "Expense Sheet", and "Client Information" corresponding to Profile of "A4pf", are set. That is, the user can select any one of the three projects from the project menu. Additionally, a service (intermediate plugin) such as "OCR" processing and a service (distribution plugin) such as distribution to a "Daily report" folder of "Quanp" that is an online storage are set. That is, the user can select the "OCR" processing or the "Quanp" distribution via the service menu screen and instruct to display the service screen corresponding to the selected service. In addition, in the service screen corresponding to the "Quanp" distribution, for example, the "Daily Report" folder is set as an initial value of the distribution destination, and user can change the distribution destination via the service screen. Alternatively, the initial value corresponding to "OCR" is not set, but for example, the initial value indicating an accuracy level for the OCR processing may be set, and a service screen corresponding to the OCR processing may be displayed based on the initial value. Alternatively, the setting items settable or not-settable in association with the OCR processing may be set according to "OCR". In this case, if, for example, a setting item of an OCR level is set as not-settable, the setting item is displayed in a gray-out state or not displayed in the service screen so as not to allow the user to set.

Additionally, "Screen Layout" corresponding to "Group" is also set in the Profile information illustrated in FIG. 9. That is, the project menu has a screen layout corresponding to a group to which a user currently logging in the MFP 10 belongs. For example, when a user belonging to "Sales" logs in, the project menu is displayed based on information on arrangement of assignment buttons (buttons for selecting projects) corresponding to "Sales". However, when a user belonging to "Development" logs in, "Screen Layout" is not set and thereby displaying the project menu with a default layout, for example. The information associated with the user and the group to which the user belongs may be stored in the control device 20 or the main unit 30 of the MFP 10. Alternatively, when using an external authentication server in the user authentication for user's login to the MFP 10, information on the group to which the user belongs may be acquired from the external authentication server.

Additionally, a user may select a layout to be displayed instead of displaying the layout of the project menu according to the group to which the user belongs. FIG. 10 is an illustration of an example of a project menu 601 displayed based on the Profile information illustrated in FIG. 9. Two buttons of "Sales" and "Development" 602 corresponding to two group set in the Profile information illustrated in FIG. 9 are displayed, and when "Sales" is selected, a layout corresponding to "Sales" is displayed on the screen. When the user selects one of assignment select buttons (project select buttons) 603 displayed, a service menu corresponding to the selected project is displayed.

FIG. 11 is a sequence diagram illustrating processing performed in the information processing system 1 according to the embodiment. On starting up the application, or performing a profile synchronization from the server device 50, the workflow control unit 210 obtains the latest profile information for the UI display. Data required for the UI display at this time is information on the project menu illustrated in FIG. 5, and other information is not required. For example, when the profile synchronization is performed with the management unit 510, various types of information are stored in the storage unit 320 via the workflow control unit 310. FIG. 11 is a sequence diagram illustrating a flow of the synchronous data from when the data is synchronized with that in the management unit 510 to when the user scans.

The workflow control unit 210 (update information acquisition unit 211) sends a request for a synchronization check to the workflow control unit 310 with the HTTP protocol (S101). This causes the workflow control unit 310 (check unit 311) to periodically check whether there is a file to be synchronized with the management unit 510 (S103). In this example, the workflow control unit 210 and the workflow control unit 310 maintain a connection to enable the HTTP communication for the synchronization check until a certain time elapses.

Subsequently, synchronization of the setting value with that in the management unit 510 is performed according to operation of the administrator (S105) and a profile synchronization is performed at the management unit 510 (S107). When the profile synchronization is performed in S107, the workflow control unit 310 (check unit 311) saves various data such as UI display screen information and application information involved with the profile synchronization in the storage unit 320 (S109) and reports the synchronization to the workflow control unit 210 as an HTTP response (S111).

Subsequently, when the synchronization is reported, the workflow control unit 210 (location information acquisition unit 212) requests for a path to the storage unit 320 where a file for a project select image is stored to display the project menu again (S113), and the workflow control unit 310 (location information provision unit 312) provides the path for the workflow control unit 210 (S115).

Subsequently, the workflow control unit 210 (processing information acquisition unit 213) generates a cache of the project select image (S117), using the path provided, accesses the storage unit 320 with the NFS to acquire the file of the project menu (S119). The workflow control unit 210 (processing execution unit 214) extracts the obtained file, which is data to be used in executing the application, in the RAM 203, and displays the project menu on the control panel 205 (S121). In S119, the workflow control unit 210 only needs to acquire the minimum information to be used for displaying the project menu. For example, when the same layout is set for each of the groups of the profile, instead of acquiring information on arrangement of the assignment buttons for each group, one arrangement information may be acquired. Additionally, instead of workflow definition information, a workflow ID, which is an identification information of the workflow, may be obtained and the information required for the screen display may be obtained based on the selected workflow ID, according to the user operation.

Subsequently, when the workflow application is selected from the application list including the copy application, the print application, the scan application, facsimile communication application, and the work application, displayed on the control device 20 and display of the project menu is requested by the user (S123), the workflow control unit 210 (processing execution unit 214) displays the project menu using the cache data cached in the RAM 203 (S125). Alternatively, the user may instruct to update a screen in the project menu displayed on the control device 20 to request for displaying the project menu, or the displaying the project menu may be requested in response to an event that the user logs in to the MFP 10.

Subsequently, when the user selects a project by pressing a project button via the project menu (S127), a path to the storage unit 320 is acquired, and the information is accessed using the path and cached in the RAM 203 for displaying the service menu screen and the service screen in the same way as the project menu. That is, the processing from S129 to S137 is the same as the processing from S113 to S121, except that the screen is the service menu screen instead of the project menu.

Subsequently, when the user operates the service menu screen and selects service to be used, the workflow control unit 210 acquires image information on a service screen corresponding to the selected service, and generates a cache and displays the service screen (S141 and S143). The processing of S141 and S143 is substantially the same as the processing of S113 to S121, except that the project service screen is the service screen. Subsequently, the user sets with the service screen and instructs to perform the workflow corresponding to the project (S145), the workflow control unit 210 controls a scan of a document set by the user (S147 and S149). The workflow control unit 310, then, sends a setting value set with the service menu screen and the service screen by the user and the scan image read by scanning to the workflow control unit 520, and requests to execute the workflow (S151). The workflow control unit 520 cooperates with the workflow execution unit 530 to execute the workflow selected by the user in relation to the scan image based on the setting value set by the user in response to an execution request from the workflow control unit 310 (S153). Alternatively, in S151, under the control of the workflow control unit 310, the information may be stored in a predetermined storage of the server device 50, and in S153, the workflow control unit 520 may be caused to acquire the information from the storage at a predetermined timing.

At a predetermined timing, for example, when the user logs out from the MFP 10, the workflow control unit 210 deletes the information except for required information for displaying the project menu out of the information of each screen cached in the RAM 203.

FIG. 12 is a sequence diagram illustrating another example of processing of the information processing system 1 according to an embodiment of the present disclosure. FIG. 12 illustrates, a case where the user selects a project and operates the service menu screen or the service screen via the control device 20 when the management unit 510 synchronizes a profile.

The processing from S201 to S217 is substantially the same as the processing from S123 to S139 of the sequence diagram illustrated in FIG. 11. That is, the processing is from when the user selects the project from the project menu to when the service menu screen that is corresponding to the selected project is displayed. In the processing from S201 to S217, the service menu screen may be replaced with the service menu. That is, the processing may be from when the user selects the project from the project menu to when the service screen that is corresponding to the selected project is displayed.

The processing from the S219 to S229 is substantially the same as the processing from S101 to S111 of the sequence diagram illustrated in FIG. 11. That is, the processing is a case where the profile is synchronized while the user operates the service menu screen or the service screen.

The workflow control unit 210 (update information acquisition unit 211) sets a synchronization flag indicating the synchronization occurring in response to a reception of a report of the synchronization as the HTTP response (S231).

Subsequently, when the user operates the service menu screen or the service menu and instructs to return to the project menu (S233), the workflow control unit 210 (location information acquisition unit 212) checks that the synchronization flag is set (S235) and requests the workflow control unit 310 for a path to a location in the storage unit 320 where the file of the project menu is stored to draw again the project menu requested to be displayed by the user (S237).

The processing from the S239 to S243 is substantially the same as the processing from the processing from S115 to S119 of the sequence diagram illustrated in FIG. 11. That is, in the profile synchronization, for example, it is possible that the administrator, according to settings corresponding to the profile, decreases or increases the number of projects that the user can select, changes a workflow definition corresponding to a project, and changes an initial value for setting a workflow and setting items settable to the control device 20 by the user, and thus the synchronized profile is required to be reflected to the screen display.

Subsequently, the workflow control unit 210 (processing execution unit 214) resets a value set by the user (S245). That is, as described above, due to the synchronization of the profile, the workflow definition, the initial value for setting and the setting items settable can be changed, and the stored setting value may not be used as it is for the screen display. Accordingly, the workflow control unit 210 (processing execution unit 214) resets the setting value. The workflow control unit 210 (processing execution unit 214) extracts the obtained file, which is data to be used in executing the application, in the RAM 203, and displays the project menu on the control panel 205 (S247).

As described above, according to the embodiment, not all of the screen information (screen information of project menu, service menu screen, and service menu) used for the UI display is collectively acquired, but the minimum information required to display an initial screen is acquired from the storage unit 320 of the main unit 30 to be cached in the RAM 203 of the control device 20. In response to a request for displaying the initial screen from the user, the information cached in the RAM 203 is used to display the screen, thereby improving responsiveness. Additionally, the minimum information is cached, thereby reducing influence on other information processing of the control device 20. Moreover, according to the user operation via the screen initially displayed, image information required to be displayed, each screen requested, with the UI display is obtained each time and thus the required information for displaying each screen with the control device 20 can be obtained efficiently, resulting in improved responsiveness.

According to the embodiment, the workflow control unit 310 monitors the profile synchronization based on the request of the workflow control unit 210, and thus the project menu can be updated at an appropriate timing when there is the profile synchronization.

In the description of the embodiment, the UI display is the processing performed based on the data obtained by the workflow control unit 210, and target information on the processing to be executed is the screen information of the UI screen is described, however other processing may be the processing to be executed.

In the workflow application, basically all of dynamic data (data that is dynamically rewritten in executing the application) is stored in the storage unit 320, and the workflow control unit 210 accesses the storage unit 320 each time when necessary and obtains the data.

Such data includes thumbnail information of a scan image used in, for example, displaying a preview screen of an image that is scanned and distributed, so that the target information on the processing to be executed may be the thumbnail information of the scan image.

Additionally, such data includes an execution result of a distribution flow of each plugin in executing scan by selecting the project used to, for example, display a job log, and thus the target information on the processing to be executed may be information indicating the execution result of the job.

Additionally, such data includes system log data used in writing a system log and transferring to the workflow control unit 520, so that the target information on the processing to be executed may be the log information.

Additionally, such data includes authentication information, so that the target information on the processing to be executed may be the authentication information. In performing apparatus authentication, the data corresponding to a login user of the apparatus is managed in the main unit 30, and the control device 20 has dummy data. When the project authentication is required, the workflow control unit 210 passes the dummy data to the workflow control unit 310, and the workflow control unit 310 checks the dummy data and performs the authentication processing using the actual authentication information.

Modified Example 1

In the description of the embodiment above, when the profile synchronization is performed, the image information of the project menu is naturally obtained from the storage unit 320 and displays the project menu again, however, the embodiment is not limited to this, and there is a case where the project menu does not change after the profile synchronization. For example, even if the profile is synchronized, there is no change in the project menu when a version of profile does not change.

Considering this, the workflow control unit 310 (check unit 311) may check the version of profile before and after the update, prior to the synchronization report in S111 in FIG. 11 or S229 in FIG. 12, may report the synchronization when both versions change, and may not report the synchronization when both versions don't change. That is, the workflow control unit 310 (check unit 311) may check whether the target information on the processing to be executed (image information of project menu) is updated instead of checking whether processing information used in at least any of the plurality of workflows is updated.

In addition, the workflow control unit 210 may change the version, instead of the workflow control unit 310. In this case, the workflow control unit 310 may report to the workflow control unit 210 with the version of profile before and after the update.

Modified Example 2

According to the embodiment described above, the workflow control unit 310 and the workflow control unit 210 are modules individually separated, however, the embodiment is not limited to this and alternatively the control device 20 may include a module in that the two functions of those are combined.

A program executed in the control device 20 and the main unit 30 according to the above-described embodiment and each modified examples (hereinafter, referred to as each device according to the above-described embodiment and each modified examples) is installed in any desired recording medium, such as a compact disc read only memory (CD-ROM), a compact disc-recordable (CD-R), a memory card, a digital versatile disk (DVD) or a flexible disc (FD), in a format installable and executed by a computer, for distribution.

Such a program for processing the information executed in each device according to the above-described embodiment and each modified examples may be stored in a computer connected to a network such as the Internet and provided by downloading via a network. Alternatively, such a program for processing the information executed in each device according to the above-described embodiment and each modified examples may be provided or distributed via a network such as the Internet. Additionally, such a program for processing the information executed in each device according to the above-described embodiment and each modified examples may be provided by implementing in, for example, a read only memory (ROM).

The program for processing the information executed in the each device according to the above-described embodiment and each modified examples has a module configuration including each functions described above. As an actual hardware configuration, a CPU reads the program from the ROM and executes the program on the RAM for processing the information and thus the each functions are performed.

Although the exemplary embodiments of the disclosure have been described and illustrated above, such description is not intended that the disclosure be limited to the illustrated embodiments. Numerous additional modifications and variations are possible in light of the above teachings. It is therefore to be understood that within the scope of the appended claims, the embodiments may be practiced otherwise than as specifically described herein. For example, elements and/or features of different illustrative embodiments may be combined with each other and/or substituted for each other within the scope of this disclosure and appended claims.

For example, the MFP 10 may execute the workflow in the server device 50 according to an instruction from the MFP 10. That is, the MFP 10 includes the workflow execution unit and the workflow control unit requests for executing the workflow to the workflow execution unit included in the self-device, but not to the server device 50, to execute the workflow. Alternatively, both of the MFP 10 and the server device 50 includes the workflow execution unit, and the MFP 10 and the server device 50 cooperate with each other to execute the workflow.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

What is claimed is:

1. An image forming apparatus, comprising:
   a first device including:
   a first memory configured to,
      store, for a plurality of jobs executable by the image forming apparatus, target information associated with displaying a setting screen for each one of the plurality of jobs, the first memory being a nonvolatile memory, and
      store a first portion of the target information used to display a menu; and
   a first processor configured to control operation of the image forming apparatus; and
   a second device communicably connected to the first device via at least one communication path, the second device including:
   a second memory configured to store, portions of the target information, the second memory being a volatile memory;
   a display; and
   a second processor configured to:
      obtain, via a first communication path of the at least one communication path, location information from the first device, the location information indicating a location where the target information is stored in the first memory, the first communication path being one of a local area network (LAN) connection and an Internet connection, and
      obtain, via a second communication path of the at least one communication path, the first portion of the target information from the first memory based on the location information, the second communication path being a universal serial bus (USB) connection such that the second communication path is different from the first communication path,
      store, in the second memory, the first portion of the target information before receipt of a user instruction to display the menu is input, the first portion of the target information being associated with displaying the menu for selecting one of the plurality of jobs to be performed by the image forming apparatus,
      display, on the display, the menu based on the first portion of the target information in response to the user instruction to display the menu,
      obtain, via the second communication path, a second portion of the target information from the first memory based on the location information, the second portion of the target information corresponding to the one of the plurality of jobs selected via the menu in response to selection of the one of the plurality of jobs by a user via the menu, and
      display, on the display, the setting screen corresponding to the one of the plurality of jobs selected by the user via the menu, based on the second portion of the target information
      wherein the first processor controls the image forming apparatus to perform the one of the plurality of jobs selected via the menu based on a setting value set via the setting screen.

2. The image forming apparatus of claim 1, wherein the second processor is configured to,
   obtain the first portion of the target information from the first memory when the first portion of the target information stored in the first memory is updated as an updated first portion of the target information, and
   store the updated first portion of the target information in the second memory.

3. The image forming apparatus of claim 2, wherein the second processor is configured to,
   determine whether the first portion of the target information has been updated in the first memory to the updated first portion of the target information, and
   re-use the first portion of the target information stored in the second memory rather than re-obtain the first portion of the target information from the first memory in response to determining that the first portion of the target information stored in the first memory is not updated.

4. The image forming apparatus of claim 1, wherein the second processor of the second device is configured to obtain the target information including the first portion of the target information and the second portion of the target information by mounting the first memory of the first device after obtaining a location of the first memory via a hyper-text transport protocol (HTTP) message from the first device.

5. The image forming apparatus of claim 1, wherein the second processor is configured to,
   delete, from the second memory associated with the second device, the second portion of the target information in response to occurrence of an event associated with the user such that the first portion of the target information remains stored therein.

6. A control device, comprising:
   a volatile memory configured to store, portions of target information;
   a display; and
   a controller including a first processor configured to:
      obtain, via a first communication path of at least one communication path, location information from an external apparatus, the location information indicating a location where the target information is stored in a nonvolatile memory of the external apparatus; and
      obtain, via a second communication path of the at least one communication path, a first portion of the target information from the nonvolatile memory of the external apparatus communicably connected to the control device based on the location information, the first portion of the target information used to display a menu, the second communication path being a universal serial bus (USB) connection such that the second communication path is different from the first communication path, store, in the volatile memory, the first portion of the target information before receipt of a user instruction to display the menu is input, the first portion of the target information being associated with displaying the menu for selecting one of a plurality of jobs to be performed by a second processor of the external apparatus;

display, on the display, the menu based on the first portion of the target information in response to the user instruction to display the menu;

obtain, via the second communication path, a second portion of the target information from the nonvolatile memory of the external apparatus based on the location information, the second portion of the target information corresponding to the one of the plurality of jobs selected via the menu in response to selection of the one of the plurality of jobs by a user via the menu;

display, on the display, a setting screen corresponding to the one of the plurality of jobs selected by the user via the menu, based on the second portion of the target information; and receive a setting value via the setting screen to cause the external apparatus to perform the one of the plurality of jobs selected via the menu based on the setting value being received.

7. The control device of claim 6, wherein the controller is configured to, obtain the first portion of the target information from the nonvolatile memory when the first portion of the target information stored in the nonvolatile memory is updated as an updated first portion of the target information, and store the updated first portion of the target information in the volatile memory.

8. The control device of claim 7, wherein the controller is configured to, determine whether the first portion of the target information has been updated in the nonvolatile memory to the updated first portion of the target information, and re-use the first portion of the target information stored in the volatile memory rather than re-obtain the first portion of the target information from the nonvolatile memory in response to determining that the first portion of the target information stored in the nonvolatile memory is not updated.

9. The control device of claim 6, wherein the controller of the control device is configured to obtain the target information including the first portion of the target information and the second portion of the target information by mounting the nonvolatile memory of the external apparatus after obtaining a location of the nonvolatile memory via a hypertext transport protocol (HTTP) message from the external apparatus.

10. The control device of claim 6, wherein the controller is configured to, delete, from the volatile memory associated with the control device, the second portion of the target information in response to occurrence of an event associated with the user such that the first portion of the target information remains stored therein therein.

11. A display control method, performed by an image forming apparatus including a first device and a second device communicably connected via at least one communication path, the first device including a first memory and a first processor, the second device including a second memory, a second processor and a display, the method comprising:

storing, in the first memory of the first device, target information associated with displaying a setting screen for each of a plurality of jobs executable by the image forming apparatus, the first memory being a nonvolatile memory;

obtaining, via a first communication path of the at least one communication path, location information from the first device, the location information by the second processor of the second device, the location information indicating a location of the first memory storing the target information, the first communication path being one of a local area network (LAN) connection and an Internet connection;

obtaining, via a second communication path of the at least one communication path, a first portion of the target information from the first memory of the first device by the second processor of the second device, the first portion of the target information used to display a menu, the second communication path being a universal serial bus (USB) connection such that the second communication path is different from the first communication path;

storing, in the second memory of the second device, the first portion of the target information before receipt of a user instruction to display the menu is input, the first portion of the target information being associated with displaying the menu for selecting one of the plurality of jobs to be performed by the image forming apparatus;

displaying, on the display of the second device, the menu based on the first portion of the target information in response to the user instruction to display the menu;

obtaining, via the second communication path, a second portion of the target information from the first memory of the first device based on the location information, the second portion of the target information corresponding to the one of the plurality of jobs selected via the menu in response to selection of the one of the plurality of jobs by a user via the menu;

displaying, on the display of the second device, the setting screen corresponding to the one of the plurality of jobs selected by the user via the menu, based on the second portion of the target information; and controlling, by the first processor, the image forming apparatus to perform the one of the plurality of jobs selected via the menu based on a setting value set via the setting screen.

12. The display control method of claim 11, wherein the obtaining the target information to be stored in the second memory is executed when the target information is updated as an updated first portion of the target information.

13. The display control method of claim 12, further comprising:

determining whether the first portion of the target information stored in the second memory has been updated in the first memory to the updated first portion of the target information, and re-using the first portion of the target information stored in the second memory rather than re-obtain the first portion of the target information from the first memory in response to determining that the first portion of the target information is not updated.

14. The display control method of claim 11, further comprising:

deleting, from the second memory associated with the second device, the second portion of the target information in response to occurrence of an event associated with the user such that the first portion of the target information remains stored therein.

* * * * *